United States Patent [19]

Kawakami et al.

[11] Patent Number: 5,569,565
[45] Date of Patent: Oct. 29, 1996

[54] HOLOGRAM RECORDING MATERIAL

[75] Inventors: Tetsuji Kawakami, Katano; Katsuya Wakita, Nara; Tatsurou Kawamura, Takatsuki; Yusuke Ozaki, Toyonaka; Hisashi Minemoto, Ohtsu; Nobuo Sonoda, Settu, all of Japan

[73] Assignee: Matsushita Electric Industrial Co., Ltd., Osaka, Japan

[21] Appl. No.: 264,235

[22] Filed: Jun. 22, 1994

Related U.S. Application Data

[63] Continuation of Ser. No. 885,197, May 19, 1992, abandoned.

[30] Foreign Application Priority Data

May 23, 1991 [JP] Japan .................................. 3-118587
Sep. 20, 1991 [JP] Japan .................................. 3-241018

[51] Int. Cl.⁶ ............................ G03H 1/02; G03H 1/04
[52] U.S. Cl. ............................. 430/1; 430/290; 430/2; 430/945; 385/5; 385/143; 385/131; 385/130; 359/1; 359/3; 359/6
[58] Field of Search ......................... 430/1, 2, 290, 430/945; 365/124; 385/5, 130, 131, 140, 141, 132, 143; 359/1, 3, 6, 9

[56] References Cited

U.S. PATENT DOCUMENTS

| | | | |
|---|---|---|---|
| 4,111,850 | 9/1978 | Kwalwasser | 430/76 |
| 4,131,462 | 12/1978 | Lee et al. | 430/2 |
| 4,517,266 | 5/1985 | Ikegami et al. | 430/2 |
| 4,886,339 | 12/1989 | Scozzafava et al. | 385/141 |
| 4,994,347 | 2/1991 | Smothers | 430/290 |
| 4,999,809 | 3/1991 | Schildkraut et al. | 365/124 |
| 5,029,979 | 7/1991 | Robello et al. | 385/141 |
| 5,064,264 | 11/1991 | Ducharme et al. | 385/130 |
| 5,112,531 | 5/1992 | Sperling et al. | 252/582 |
| 5,135,826 | 8/1992 | Ritt et al. | 430/28 |
| 5,184,323 | 2/1993 | Schildkraut et al. | 365/124 |
| 5,198,514 | 3/1993 | LeBarny et al. | 526/259 |
| 5,223,356 | 6/1993 | Kumar et al. | 430/1 |

FOREIGN PATENT DOCUMENTS

| | | | |
|---|---|---|---|
| 404098 | 12/1990 | European Pat. Off. | |
| 0453362 | 10/1991 | European Pat. Off. | 430/1 |
| 407773 | 1/1991 | France | |
| 453362 | 10/1991 | France | |
| 3-96982 | 4/1991 | Japan | 430/1 |
| 4-14083 | 1/1992 | Japan | 430/2 |
| 2198546 | 11/1987 | United Kingdom | |

*Primary Examiner*—Martin J. Angebranndt
*Attorney, Agent, or Firm*—Fish & Richardson PC

[57] ABSTRACT

A hologram recording device, which comprises a recording layer of a polymer composition a photoconductive element, a second-order super-polarization element and an electron or hole capturing material and having a non-centro symmetric structure is disclosed. Transparent electrode layers are provided on each side of the recording layer. The hologram recording device is capable of space light modulation and real time hologram recording. Also disclosed is a method of manufacturing the hologram recording device and a method of hologram recording using the device. The hologram recording material is of a polymer composition a photoconductive element, a second-order super-polarization element and an electron or hole capturing element. The polymer composition has a non-centro symmetric structure. The hologram recording device according to the invention comprises a recording layer of a polymer composition including a photoconductive element and a second-order super-polarization element. The polymer composition has a non-centro symmetric structure, and transparent electrodes are provided on each side of the recording layer. It is thus possible to provide a hologram recording element, which is suitable for space light modulation and real time hologram recording and which also serves as a phase conjugate device.

4 Claims, 4 Drawing Sheets

Figure-10

HOLOGRAM RECORDING MATERIAL

This application is a continuation of U.S. application Ser. No. 07/885,197 filed May 19, 1992, now abandoned.

FIELD OF THE INVENTION

This invention relates to a photorefractive hologram recording device capable of space light modulation, real time hologram recording and so forth, a method of manufacturing the same and a method of hologram recording using the same device.

BACKGROUND OF THE INVENTION

Hitherto, the photorefractive effect has been found with second-order non-linear optical crystals of lithium niobate, barium titanate, strontium barium niobate, bismuth silicon oxide, etc. and investigated and utilized as a space light modulator, real time hologram recording device and phase conjugate device.

Organic second-order (quadratic) non-linear optical materials have recently been attracting attention because of their expected high non-linear optical constant. Extensive researches and investigations are being conducted particularly for the purposes of their use for wavelength conversion of laser beams and as an electro-optical modulator based on the Pockels effect.

Further, there is a recent new confirmation that a photorefractive effect, which has heretofore been confirmed only with inorganic crystals, is also provided by organic crystals, which comprise 2-cyclooctyl amino-5-nitropyridine doped with tetracyanoquinoline (TCNQ) and serve as second-order non-linear optical materials (K. Sutter, J. Hulliger and P. G üunter, Solid State Communications, Vol. 74, No. 8, page 867–870, 1990).

Further, with a polymer composition, which is obtained by doping an epoxy polymer composed of 2,2-bis(4'-hydroxyphenyl)propane diglycidylether (i.e., commonly termed diglycidylether of bisphenol A) and 4,nitro-1,2-phenylenediamine with diethylaminobenzaldehydrazone, a photoconductive material, having a glass transition temperature of 65° C. and which generates diffracted light on the order of 0.001%, is observed to exposing the composition by holographic exposure at a light intensity of 13 W/cm$^2$ in the presence of an applied electric field to promote the orientation of the nitroaniline part (Stephan Ducharme, J. C. Scott, R. J. Tweig and W. E. Moerner, Physical Review Letters, 65(14), 1846–1849, 1991).

However, with inorganic materials such as bismuth silicon oxide, large single crystals can not be readily obtained, and thus it is difficult to produce a hologram recording device having a large recordable area. The device is thus expensive because of a low efficiency of manufacture.

With organic materials, on the other hand, it is thought to be possible to increase the area and reduce the price of the hologram recording device. However, 2-cyclooctyl amino-5-nitropyridine doped with tetracyanoquinoline noted above, is infeasible because its sensitivity and diffraction efficiency are both low.

Besides, since it is an organic crystal, it is not easy to obtain a hologram recording device having a large area.

Further, with an epoxy-based polymer non-linear optical material doped with a photoconductive material of low molecular weight as noted above, although it is a polymer composition, the solubility of the photoconductive material is low, and the composition is incapable of thermal hardening in a polarized state. Stability thus is lacking. In addition, the composition is inferior in the charge generation capacity and has substantially no charge trap. Therefore, it is impossible to expect formation of a large space charge distribution. For example, it is impossible to expect increase in the diffraction efficiency.

SUMMARY OF THE INVENTION

An object of the invention for solving the above problems, is to provide a hologram recording material comprising an organic material having a non-crystalline polymer composition, as well as a hologram recording device, which uses such material, readily permits area increase and has high sensitivity, high diffraction efficiency and stable characteristics, and a method of manufacture, which permits manufacture of hologram recording devices inexpensively and with high efficiency.

Another object of the invention is to provide a method of hologram recording using the hologram recording device according to the invention.

To solve the above problems according to a first aspect of the invention we provide a hologram recording material, which comprises a polymer composition, the polymer composition comprising a photoconductive component, a second-order super-polarization component and an electron or hole capturing component, the polymer composition having a non-centro symmetric structure.

It is preferable in this invention that the electron or hole capturing element is a compound capable of forming an oligomer anion radical or an oligomer cation radical.

It is preferable in this invention that the electron or hole capturing element is a compound capable of forming a dimer cation radical of carbazole.

According to a second aspect of the invention we provide a hologram recording device which comprises a recording layer of a polymer composition, the polymer composition comprising a photoconductive component, a second-order super-polarization element and an electron or hole capturing component, the polymer composition having a non-centro symmetric structure, and transparent electrode layers provided on each side of the recording layer.

It is preferable in this invention that the electron or hole capturing component is a compound capable of forming an oligomer anion radical or an oligomer cation radial.

It is preferable in this invention that the electron or hole capturing component is a compound capable of forming a dimer cation radical of carbazole.

It is preferable in this invention that the recording layer is of a polymer composition including a monomer having a carbazole sheleton.

It is preferable in this invention that the insulating layers provided between the recording layer and each the transparent electrode layer.

According to a third aspect of the invention we provide a method of manufacturing a hologram recording device comprising at least the steps of:

(1) preparing a solution containing a polymer composition comprising a photoconductive component in the solid state, a second-order super-polarization component and an electron or hole capturing component, (2) forming a recording layer by coating the solution containing the polymer composition on a transparent electrode layer formed on a transparent substrate and then drying the coating, and (3) fusing together two transparent substrates obtained through the recording layer formation step with the recording layers of the substrates being overlapped by using a heating press, and polarizing the fused recording layer by heating the fused recording layer to a temperature of about or above the glass transition temperature of the polymer composition while applying an electric field between the transparent electrode layers, and subsequently cooling down the heated recording layer.

According to a fourth aspect of the invention we provide a method of manufacturing a hologram recording device comprising the steps of:

(1) preparing a polymer composition comprising a photoconductive component in the solid state and a second-order super-polarization component, (2) forming a recording layer by thermally processing the polymer composition into the form of a plate, (3) forming insulating layers on each side of the recording layer, (4) providing transparent electrode layers on each insulating layer, and (5) heating the recording layer to a temperature of about or above the glass transition temperature of the polymer composition while applying an electric field between the transparent electrode layers, and then cooling down the polymer composition.

According to a fifth aspect of the invention we provide a method of manufacturing a hologram recording device comprising at least the steps of;

(1) preparing a solution containing a polymer composition comprising a photoconductive component in the solid state, a second-order super-polarization component and an electron or hole capturing component, (2) forming a film of said polymer composition by coating the solution of the polymer composition and then drying the coating, (3) fusing together a plurality of films formed through the film formation step by sandwiching the plurality of films as a stack between two transparent substrates each with a transparent electrode layer formed on one side such that the transparent electrode layer is in contact with the film stack using a heating press, and (4) heating the fused recording layer to a temperature of about or above the glass transition temperature of the polymer composition while applying an electric field between the transparent electrode layers, and subsequently cooling down the heated recording layer.

According to the invention, there is further provided a method of hologram recording comprising irradiating a coherent beam at each side of a recording layer of a polymer composition, the polymer composition comprising a photoconductive component and a second-order super-polarization component, the polymer composition having a non-centro symmetric structure, wherein a DC voltage is applied during the coherent beam irradiation between transparent electrode layers provided on each side of the recording layer.

The hologram recording material according to the invention includes at least three different elements, i.e., a low molecular weight molecule, a monomer, an oligomer or a polymer having photoconductivity; a low molecular weight molecule, a second-order super-polarization monomer or polymer; and an electron or hole capturing material. By providing the polymer composition including these elements with a non-centro symmetric structure, the second-order super-polarization element contributes to the production of a Pockels effect. The non-centro symmetric structure can be attained by synthesizing or dispersing the three components into the form of a thin film or a plate and then poling (or polarizing) the thin film or plate by heating the same to a temperature of about or above the glass transition temperature of the polymer composition while applying an electric field. The second-order super-polarization component, which has a high dipole moment in the ground state and also has a high second-order super-polarization factor, can induce a greater Pockels effect and thus permits improvement of the hologram recording sensitivity and diffraction efficiency. With the inclusion of the electron or hole capturing component, carriers generated in the photoconductive component as a result of the beam irradiation are readily trapped to form a space charge distribution in the polymer composition. Owing to this space charge distribution, the internal electric field is increased to improve the hologram recording sensitivity and diffraction efficiency.

With the above hologram recording device, comprising a recording layer of a polymer composition and transparent electrode layers provided on each side of the recording layer, an electric field can be applied in the thickness direction of the recording layer to obtain a structure which is spontaneously polarized in a direction normal to the recording surface. It is thus possible to obtain recording of optical phase gratings parallel to the recording surface, i.e., recording of a reflection type hologram. It is also possible to make a recording while applying an electric field. Further, when the orientation generated by poling relaxes with a result of deterioration of performance, the poling can be readily made again.

Further, with a recording layer comprising a polymer composition including a monomer having a carbazole skelton, radial ion pairs are generated by irradiation to provide photoconductivity with radical cations moving as carriers. Further, since this eliminates aggregation of the photoconductive material, it is possible to carry out poling accompanied by heating or cooling to fix the orientation. Further, with a photoconductive polymer having carbazole skeltons, radical ions are readily trapped in dimer sites where a plurality of parallel carbazole rings face one another. Thus, a residual space charge can be readily formed to permit induction of greater refractivity changes.

Further, with the formation, on a transparent substrate or like support, of the basic structure of a hologram recording device comprising a recording layer of a polymer composition and transparent electrode layers formed on each side of the recording layer, it is possible to improve the mechanical strength of the overall hologram recording device.

Further, with an insulating layer formed between the recording layer of the polymer composition and each transparent electrode layer, it is possible to improve the dielectric breakdown voltage and increase the electric field applied across the recording layer.

In the method of manufacturing a hologram recording device according to the invention, a solution of the hologram recording material is coated on a transparent electrode layer on a transparent substrate and then dried, two of the transparent substrates are then fused together with the recording layers being overlapped by using a heating press, and the resultant recording layer is poled by heating to a temperature of about or above the glass transition temperature of the polymer composition while applying an electric field between the transparent electrodes. The following two functions are achieved.

(1) Since the transparent electrode layer is supported by the transparent substrate, it is not deformed by electrostatic forces of attraction during the heating for poling.

(2) Since the recording layer is formed substantially from a solution and subsequently two such recording layers are fused together using a heating press, the formation of the recording layer can be completed by heating at a comparatively low temperature and for a short period of time, thus resulting in less thermal deterioration of the performance of the recording layer.

In another method of manufacturing a hologram recording device according to the invention, a recording layer in the form of a plate is formed by thermally processing a polymer composition including a monomer having a carbazole skeleton and a reactive monomer having an intramolecular charge transfer type dye skeleton, then an insulating layer is formed on at least each side of the recording layer, then a transparent electrode layer is formed on each insulating layer, and then the recording layer is poled by heating to a temperature of about or above the glass transition temperature of the recording layer while applying an electric field between the transparent electrodes. Thus, it is possible to achieve a comparatively large thickness of the recording layer and obtain a high diffraction efficiency.

In a further method of manufacturing a hologram recording device according to the invention, a film of a polymer composition comprising a photoconductive component and a second-order super-polarization component is formed by coating and drying a solution of the polymer composition. A plurality of the films are fused together by sandwiching them as a stack between two transparent substrates with a transparent electrode layer formed on one side such that the transparent electrode layer is in contact with the film stack using a heating press. The resultant recording layer is heated to a temperature of about or above the glass transition temperature of the polymer composition while applying an electric field between the transparent electrode layers and subsequently cooling down the heated recording layer. Thus, the following three functions are achieved.

(1) Since the transparent electrode layer is supported on the transparent substrate, it is not deformed by electrostatic forces of attraction during the heating for poling.

(2) Since a plurality of polymer composition films formed from a solution are fused together using a heating press, the formation of the recording layer can be completed at a comparatively low temperature and for a short period of time, thus resulting in less thermal deterioration of performance of the recording layer.

(3) Since the recording layer is formed from a plurality of films as a stack using a heating press, it is readily possible to increase the thickness of the recording layer and obtain a high diffration efficiency device.

In a method of hologram recording according to the invention, a coherent beam is irradiated on each side of a recording layer of a polymer composition, which comprises a photoconductive component and a second-order super-polarization component and said polymer composition having a non-centro symmetric structure, while applying a DC voltage between transparent electrode layers provided on each side of the recording layer. Thus, it is possible to increase the radical ion dissociation efficiency with the beam irradiation, thus obtaining a space charge distribution in the thickness direction of the recording layer. It is thus possible to make effective use of the electro-optical constants of the recording layer to improve the hologram recording sensitivity and diffraction efficiency.

DETAILED DESCRIPTION OF THE INVENTION

Now, embodiments of the hologram recording material, hologram recording device and method of manufacturing the same according to the invention will be described.

First, the hologram recording material according to the invention will be described.

The polymer composition, which includes a photoconductive, a second-order super-polarization component and an electron or hole capturing component, can be obtained by blending, molecular dispersion or co-polymerization of a polymer or a (reactive) monomer [the term "(reactive) monomer" in the specification referring to a low molecular weight compound capable of reaction to produce a polymer or a low molecular weight compound without any reactivity, the term "reactive monomer" referring to a usual low molecular weight compound capable of reaction to produce a polymer] having photoconductivity, a polymer or a (reactive) monomer capable of second-order super-polarization and an electron or hole capturing material. By poling the polymer composition thus obtained by heating it to a temperature of about or above its glass transition temperature while applying an electric field, a non-centro symmetric structure can be obtained.

Examples of the polymer or (reactive) monomer having photoconductivity are monomers and polymers having a carbazole skeleton, e.g., vinyl carbazole and carbazolyalkyl methacrylate, triphenylamine derivatives, e.g., N,N'-diphenyl-N,N'-bis (3-toluoyl)- 4,4'-diaminobiphenyl (TPD), pyrazoline derivatives, triphenylmethane derivatives, hydrazone derivatives, oxadiazole derivatives and indoline derivatives. Preferred examples are polymers, which can also serve as a hole capturing material and have a carbazole skeleton free from aggregation.

Second-order super-polarization is more or less provided by substantially all organic molecules, and therefore the polymer or (reactive) monomer capable of second-order super-polarization is not particularly limited. However, to obtain great refractive index changes (i.e., to obtain a substantial Pockels effect), a (reactive) monomer or polymer, which provides high dipole moment in the ground state and is capable of great second-order super-polarization, is preferred. Examples of such compound are such intramolecular charge transfer type dies as nitroaniline derivatives, benzilidene malononitrile derivatives, β-phenyl-α-cyanoacrylate derivatives, β-aminostyrene derivatives, tricyanostyrene derivatives, aminonitroazobenzene derivatives and aminonitrostylbene derivatives. If these derivatives have reactive functional groups such as vinyl, acryloyl and methacryloyl groups, they may be used as a reactive monomer and also as a polymer if polymerized.

Examples of the electron or hole capturing material are strong electron acceptor compounds such as aromatic compounds having a plurality of nitro and cyano groups and strong electron donor compounds such as aromatic compounds having amino groups, alkyl or allylamino groups, etc. The material may have such reactive functional groups as vinyl, acryloyl and methacyloyl groups as well. Further, compounds capable of forming oligomer ion radicals, e.g., dimer anion radicals and dimer cation radicals, are suitable in that they can readily form energetically stable and deeper traps to permit ready storage of charge and also permit improvement of the hologram recording sensitivity and diffraction efficiency. Particularly, compounds capable of dimer cation radicals of carbazole are preferred in that they are comparatively highly soluble. Compounds capable of forming dimer cation radicals of carbazole are specifically carbazole derivatives. These oligomers and polymers provide a strong trap because carbazole skeletons forming a dimer portion are adjacent to one another. If the (reactive) monomer or polymer having photoconductivity has a carbazole skeleton like poly(vinylcarbazole) and poly(carbazoleacrylate), it may serve as the hole capturing material as well.

The blending, molecular dispersion or co-polymerization of the polymer or (reactive) monomer having photoconductivity, the polymer or (reactive) monomer capable of providing a great Pockels effect when poled and the electron or hole capturing material, will now be described.

(1) If the three components are all reactive monomers, a polymer composition having all of the components can be obtained through co-polymerization. The co-polymerization can be readily attained by radical polymerization in a usual operation. Ion polymerization is also possible depending on the combination of monomers.

(2) If the three components are all polymers, a polymer composition having all of the components can be obtained by blending the polymers as solution or in a melted state.

(3) If one component is a monomer while the other components are polymers, a polymer composition having all of the components can be obtained through molecular dispersion of the monomer in the polymers.

(4) If the three elements are all non-reactive monomers, a polymer composition having all of the components can be obtained through molecular dispersion of the three components in a polymer as a binder. In this case, a material having affinity to all the three components may be suitably selected as the binder.

The (reactive) monomer or polymer capable of a great second-order super-polarization tends to be readily aggregated, and if polymers that are blended have low affinity to one another, it may result in light scattering and hence lack of transparency. Therefore, the above method (1), in which reactive monomers are co-polymerized to obtain a polymer composition, is most preferred.

Further, for increasing the photoconductive sensitivity wavelength or increasing quantum yield, it is preferable to form a charge transfer type complex of photoconductive polymer and monomer by adding an electron donor or acceptor material or the like. For example, where poly(vinylcarbazole) is used as a photoconductive polymer composition, sensitivity to red light can be obtained by adding trinitrofluorenone, tetranitrofluorenone, etc. If these additives have reactive functional groups, it is suitable to co-polymerize these groups as co-monomers.

The (reactive) monomer or polymer capable of second-order super-polarization are suitably those, which are subject to less absorption of the wavelength for hologram recording and reconstruction. However, this is not so for reconstruction with white light.

Usually, the greater the second-order super-polarization, the absorption wavelength is subject to the greater wavelength shift. However, alkoxybenzylidenemalononitrile, β-(4-alkoxyphenyl)-α-cyanoacrylate derivatives and so forth are similar to nitroaniline, which has an absorption band up to about 500 nm, although they do not substantially have any absorption band in the visible range. Thus, by using monomers or polymers having these compounds in the side chain, it is possible to use an argon laser of, for example, 488 nm as the light source of recording.

Figure 1:
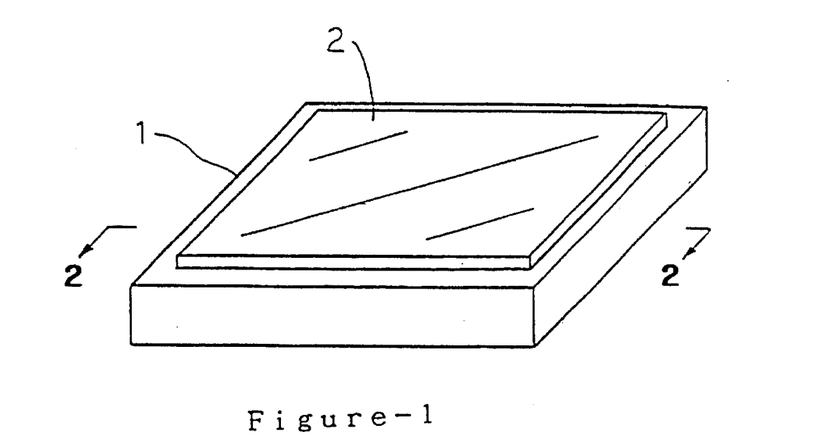
FIG. 1 is a schematic perspective view showing an embodiment of the hologram recording device according to the invention.
Figure 2:
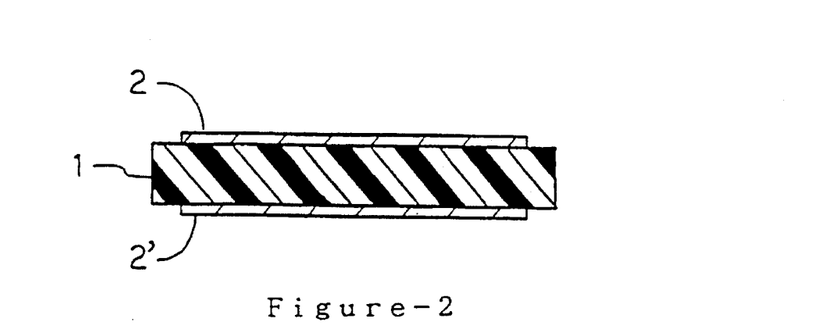
FIG. 2 is a schematic sectional view taken along line A—A' in FIG. 1.

FIG. 1 is a perspective view showing an embodiment of the hologram recording device according to the invention, and FIG. 2 is a sectional view taken along line A—A' in FIG. 1.

This recording device comprises a recording layer 1 of a polymer composition, which includes a photoconductive component and a second-order super-polarization component and has a non-centro symmetric structure, and transparent electrodes 2 and 2' having transparent electrode layers formed on each side of the recording layer 1.

Figure 3:
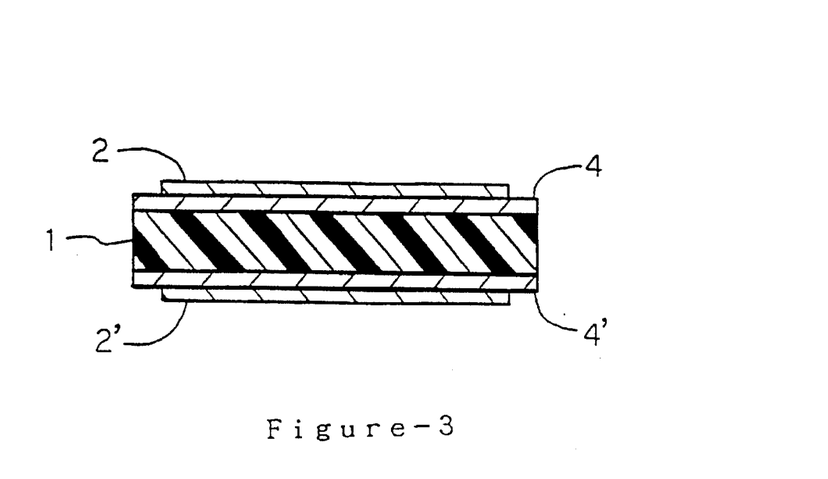
FIG. 3 is a schematic sectional view showing a further embodiment of the hologram recording device according to the invention.
Figure 4:
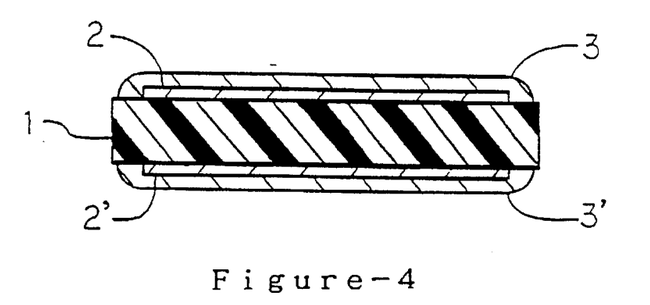
FIG. 4 is a schematic sectional view showing a further embodiment of the hologram recording device according to the invention.
Figure 5:
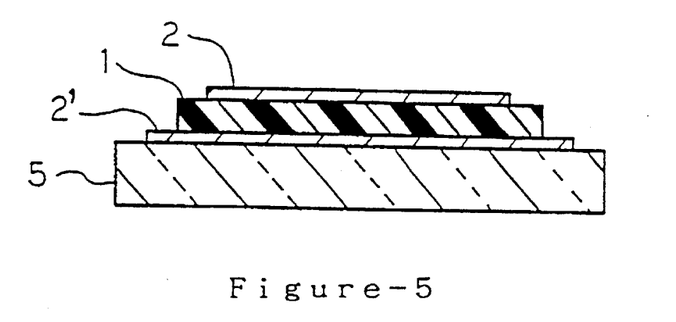
FIG. 5 is a schematic sectional view showing a still further embodiment of the hologram recording device according to the invention.
Figure 6:
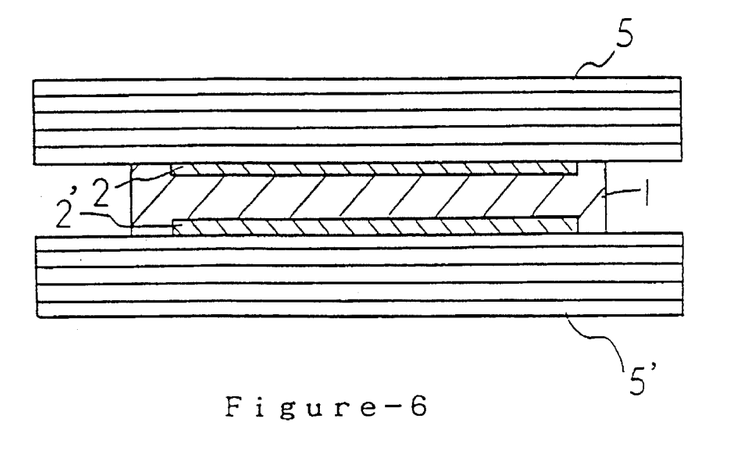
FIG. 6 is a schematic sectional view showing a further embodiment of the hologram recording element according to the invention.

The hologram recording device according to the invention is also shown in FIGS. 3 to 6. In FIG. 3, insulating layers 4 and 4' are provided between the recording layer 1 and each of the transparent electrodes 2 and 2' In FIG. 4, insulating protective layers 3 and 3' are provided on the surface of each of the transparent electrodes 2 and 2' for protecting the same. In FIG. 5, a first transparent electrode 2' is provided on a transparent substrate 5, the recording layer 1 of a hologram recording material according to the invention is provided on the first transparent electrode 2', and a second transparent electrode 2 is provided on the recording layer 1. In FIG. 6, a first transparent electrode 2' is provided on a first transparent substrate 5', the recording layer of a hologram recording material according to the invention is provided on the first transparent electrode 2', a second transparent electrode 2 is provided on the recording layer 1, and a second transparent substrate 5 is provided on the second transparent electrode 2.

To obtain the above structures, the polymer composition of recording layer 1 has to be processed into a form like a substrate or a thin film. This may be done so by one of at least two methods.

In the first method, the composition is melted and molded. In this case, it may be processed into forms like a substrate or a thin film having various shapes using an extruder, a heating press, an injection molding machine or a drawing machine. In the injection molding or drawing, high anisotropy or density difference (or refraction difference) depending on position is readily produced. Therefore, it is important to appropriately select conditions and anneal the processed structure.

In the second method, the structure is formed from the composition in a solution, and a thin film of the composition may be obtained by dipping, casting or spin coating. These processes usually tend to permit formation of large thickness film without difficultly, and preferred among them is the casting process, in which a highly concentrated solution is coated using a doctor blade, and the casting process, in which a highly concentrated solution is allowed to drop through a slit and dried from the opposite sides.

Further, a combination of the first and second processes is effective. For instance, laminating layers formed by the casting process and then melting and molding the composition. That is, in a preferred method of producing a hologram recording device according to the invention, a solution of the hologram recording material according to the invention is coated on the transparent electrodes 2 and 2' and dried to form the recording layers 1, which are then overlapped and fused together by melting and pressing them, followed by poling to be described later. This method is preferred in that compared to a method solely based on the melding and molding, which inevitably involves the extruding operation, less heat is applied to the recording layer 1 (i.e., the hologram recording material according to the invention), thus resulting in less deterioration of performance. Similar effects can be obtained with a method, in which, for providing an increased thickness of the recording layer 1, a plurality of polymer composition films obtained by casting or like process are melted and pressed between opposite transparent electrode sides of a transparent substrate with transparent electrode layers. (For example, the transparent electrodes 2 and 2' and transparent substrates 5 and 5' shown in FIG. 6.) Thus, the method according to the invention is preferred.

The transparent electrode formed on each side of the recording layer 1 need only be transparent with respect to the wavelengths of light used for the hologram recording and reconstruction, and thus it may be a usual transparent electrode of, for instance, ITO or $SnO_2$. Further, it is possible to utilize very thin films of aluminum, silver, gold or like metal with a thickness of 100 nm or below as a semi-transparent electrode. A semi-transparent electrode, however, is not preferred in that it is not sufficiently transparent and reduces the intensity of light utilized for recording or reconstruction. Further, the thickness of the transparent electrode is suitably excluded from the interference conditions, which are determined by such factors as the wavelength and angle of incidence of light used for the recording and reconstruction.

In the recording device shown in FIG. 3, the insulating layers 4 and 4' are each provided on each side of the recording layer 1 of the polymer composition, which has photoconductivity and provides the Pockels effect, and the transparent electrode layers 2 and 2' are each provided on each of the insulating layers. With the provision of the insulating layers 4 and 4', the insulation breakdown voltage can be improved to permit increase of the electric field set up in the recording layer. It is also possible to provide an insulating layer on only one side.

The insulating protective layers 3 and 3' provided on the transparent substrate 1 with the transparent electrodes 2 and 2' shown in FIG. 4, need only be of a material which is transparent with respect to the wavelength of recording and reconstruction, and they may be of an organic or inorganic material.

The transparent substrates 5 and 5' shown in FIGS. 5 and 6 need only be satisfactorily light-permeable with respect to the wavelength of light used for the hologram recording and reconstruction. They may be quartz substrates or various glass substrates which are used exclusively as transparent substrate materials. Their thickness is suitably about 50 μm (microns) or above in order to avoid generation of light interference in them. Further, for effective utilization of light used for the hologram recording or reconstruction, it is suitable to provide the transparent substrates 5 and 5', on the side not provided with the transparent electrodes 2 and 2', with anti-reflection coatings to prevent reflection at the surface.

The recording layer 1 may be in the form of either a substrate or a thin film, and the transparent electrodes 2 and 2' may be formed on the recording layer 1 by a vacuum plating process such as vacuum deposition or spattering. Further, layer or electrode formation on the transparent substrate 5 as shown in FIG. 5 or 6, may be by a wet plating process such as a spray pyrolysis as well as the vacuum plating processes such as vacuum deposition and spattering.

Now, poling for imparting the ability of producing the Pockels effect to the polymer composition of the recording layer 1, will be described.

The polymer composition with the transparent electrodes 2 and 2' provided on its opposite sides, can be polarized with orientation of dipoles as part of the monomer or polymer by poling it by applying an electric field while it is heated to the glass transition temperature or above. By cooling down the composition to a temperature below the glass transition temperature while it is held in the polarized state as above, the molecular orientation is fixed, thus obtaining a non-centro symmetric structure. A material having such a structure can produce the Pockels effect.

The electric field as noted above is applied between opposite side transparent electrode layers, When the application of the electric field is discontinued while the composition is heated, immediate orientation relaxation of molecules takes place. Therefore, application of the electric field is suitably continued at least until the composition is cooled down to about room temperature from the glass transition temperature.

Since the polymer composition (i.e., recording layer 1) to be poled is photoconductive, the poling is suitably carried out in an environment free from exposure to light of the wavelength corresponding to the sensitivity of the photoconductivity.

The electric field need not necessarily be applied between the opposite side transparent electrodes. That is, the polymer composition may be applied by corona discharge using a corotron or the like to the recording material in the form of a substrate (for example, disk or plate etc.) or a thin film prior to the formation of the transparent electrodes on the opposite sides of the recording layer 1. This method of poling, in which the poling can be carried out prior to the formation of the electrodes, i.e., prior to the formation of the device, is particularly useful to produce sheet-like hologram recording material in a great quantity.

Further, the method of producing a hologram recording device according to the invention is suitably used to produce the hologram recording device of the type shown in FIG. 6. In the method according to the invention, the transparent electrodes 2 and 2' do not undergo deformation due to electrostatic attraction during the poling process in the heated state as noted above owing to the support of the electrodes 2 and 2' by the transparent substrates 5 and 5'.

Thus, a satisfactory hologram recording device can be formed.

Now, a method of hologram recording using the hologram recording device according to the invention will be described.

The polymer composition which includes the recording layer 1 of the hologram recording device according to the invention, is commonly termed a poled polymer and has a structure with its individual dipoles oriented in a direction normal to the surface of the recording layer 1. Thus, when there is an electric field extending in a direction normal to the surface of the recording layer 1, the refractive index in the direction normal or parallel to the surface of the recording layer 1 is varied.

Figure 7:
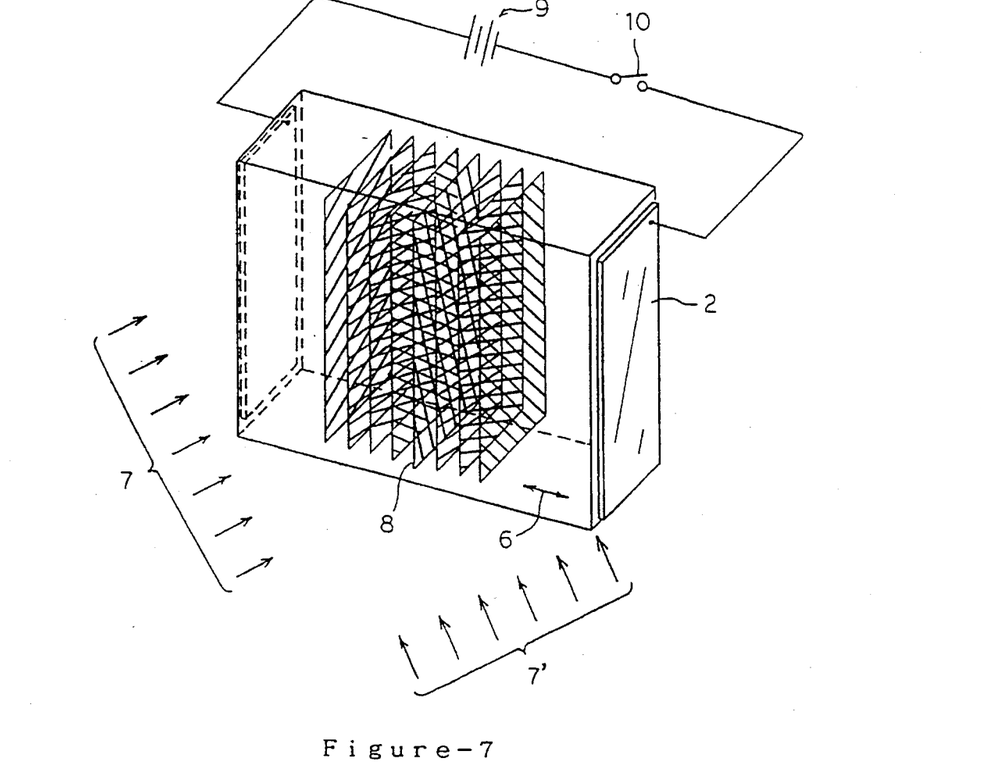
FIG. 7 is a schematic view illustrating a method of hologram recording, which can make an effective use of an electro-optical constant of a poled polymer.

Usually, as for the electro-optical constants of the poled polymer, $r_{33}$ is greatest, and $r_{13}=r_{23}=r_{33}/3$, and $r_{11}=r_{22}=0$. Thus, as a light irradiation system, the maximum value of greatest $r_{33}$ is utilized for hologram recording interference fringe is formed normal to the poling direction, as shown in FIG. 7.

In this case, the interference fringe itself is normal to the hologram recording surface, and thus the hologram recording is of a transmission type. However, increasing the recording area increases the inter-electrode distance, thus a higher voltage must be applied which is proportional to the inter-electrode distance to maintain the electric field necessary for poling. This is practically infeasible.

Figure 8:
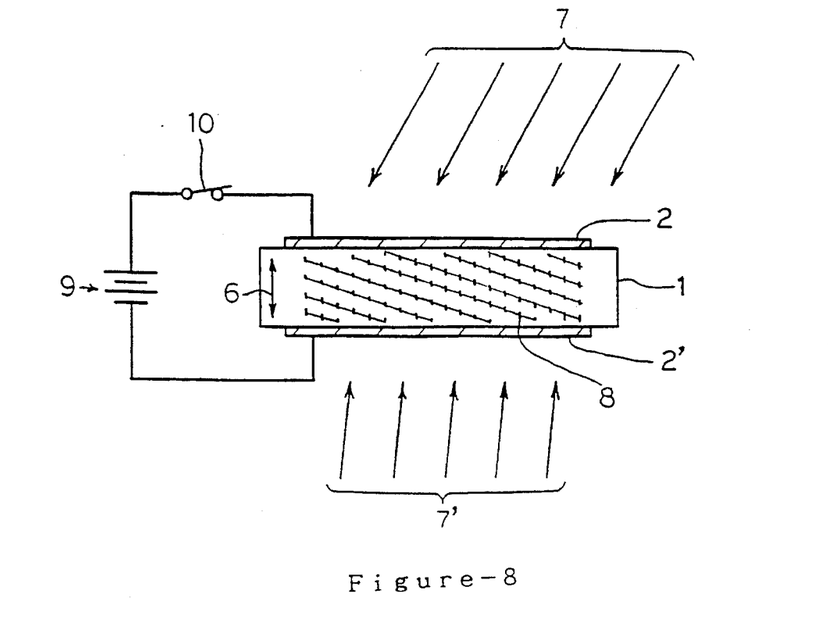
FIG. 8 is a schematic view illustrating a method of hologram recording according to the invention.

With the provision of the transparent electrodes 2 and 2' on the opposite sides of the recording layer 1, as shown in FIG. 8, poling can be obtained in a direction 6 normal to the hologram recording surface. In this case, the hologram recording is suitably carried out by irradiating the opposite hologram recording surfaces, one with objective beam 7 and the other with reference beam 7'. In this case, interference fringe nearly parallel to the surface of the recording layer 1 is formed in the recording layer 1. In the bright portions of the interference fringe, carriers are generated and diffused or mored. The carrier distribution maintains substantially the same pitch although there may be a phase deviation with respect to the interference fringe. Consequently, a charge distribution is formed in the polymer composition (i.e., recording layer 1). The internal electric field due to this residual charge is substantially the same as the interference fringe pitch at the time of the exposure. This internal electric field distribution induces a Pockels effect in the recording layer 1, and thus induces substantially the same distribution of refractive index as that of light intensity by the interference at the time of the exposure. Consequently, a hologram recording can be obtained. Reference numeral 9 designates a power supply for applying the electric field, and 10 a switch.

Since the recording layer of the polymer composition as noted above is held in an electric field at the time of the exposure, radial ion pairs are generated efficiently in bright portions of the interference fringe, and thus a large electric field based on space charge distribution is formed.

The hologram recording uses a coherent (or interferable) beam having a wavelength in the photoconductive sensitivity range of the photoconductive polymer composition. Particularly, a laser beam is preferred because it permits a coherent beam to be readily obtained. For the hologram recording, it is suitable to split a coherent beam from a light source by means of a beam splitter into two split beams and set the same optical path length for the two split beams up to the hologram recording device for irradiation. As for the reference beam for reconstruction, a greater angle of incidence on the recording layer is more effective because the contribution of $n_z$ for the effective refractive index becomes larger.

Figure 9:
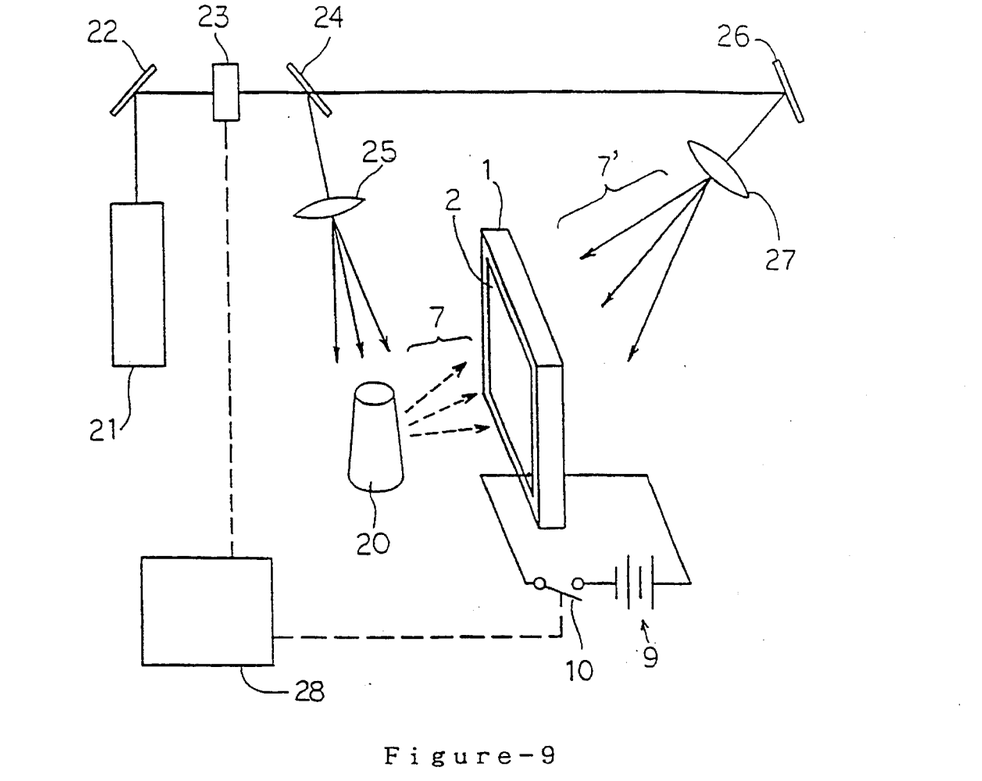
FIG. 9 is a schematic view showing an interferrometer, which permits use of the method of hologram recording according to the invention.

FIG. 9 schematically shows an example of an interferometer, which permits use of the hologram recording method according to the invention.

A beam emitted from a laser 21 is coupled by a mirror 22 to a shutter 23 and thence split by a beam splitter 24 into two split beams. One of the split beams is converted by a lens 25 into a divergent beam to irradiate an object 20, while the other split beam is coupled by a mirror 26 to a lens 27 for conversion into a divergent beam to irradiate the recording layer 1. The beam incident on the object 20 is modulated by information of the object to partly irradiate the recording layer 1. In the recording layer 1, the two incident beams interfere to form a carrier distribution corresponding to the interference fringe. A timer 28 controls the exposure time and the electric field applied across the recording layer.

Now, a method of hologram reconstruction using the hologram recording device according to the invention will be described.

Figure 10:
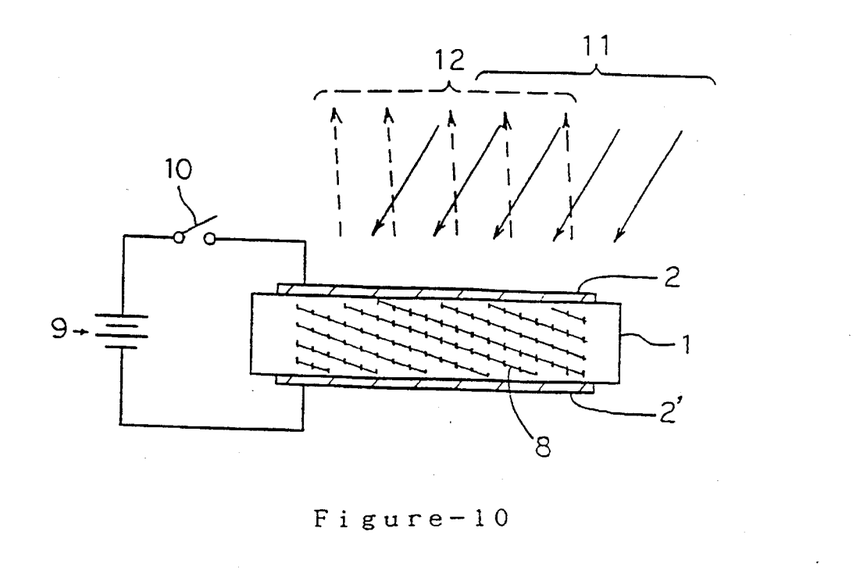
FIG. 10 is a schematic view illustrating a method of reproducing a hologram recorded on the hologram recording device according to the invention.

FIG. 10 shows a set-up for hologram reconstruction. One of the split beams that is used at the time of the exposure, is used as the reference beam 11, thus generating a reconstructed beam 12 through diffraction.

The reference beam 11 varies in the effected refractive index depending on its incidence angle and polarization. In the case of the s polarization, the components $n_z$ and $n_x$ are respectively normal and parallel to the surface of the recording layer, and in the case of the p polarization the components $n_x$ and $n_y$ are respectively normal and parallel to the recording layer surface.

The electro-optical constant $r_{33}$ is greater than $r_{13}$ or $r_{23}$, that is, the refractive index change is greater with $n_z$ than with $n_y$, $n_x$. Thus, the s polarization can be used more advantageously.

With the hologram recording method according to the invention, however, a reflection hologram capable of wavelength Thus, there is no need to use any coherent beam like lasers or any polarized light for the reconstruction. it is possible to utilize a polychromatic (non-monochromatic) light source such as a solar beam or an electric light beam. In the case of the polychromatic beam, the photoconductive sensitivity of the recording layer is higher to the shorter the wavelength. To avoid generation of new carriers, therefore, the reference beam suitably has fewer short wavelength components. Further, to suppress hologram image distortion, suitably a divergent beam is used as the reference beam as well as for reconstruction when the reference beam for the recording is a divergent beam, while using a parallel beam as the reference beam as well as for reconstruction when the reference beam for the recording is a parallel beam.

Further, if a large electric field is applied at the time of irradiation of the reference beam for reconstruction, it promotes carrier generation during irradiation and erases the recorded carrier distribution. Therefore, it is not suitable to apply an electric field like that for the recording.

Now, a hologram erasing method using the hologram recording device according to the invention will be described.

To erase a recorded hologram, a beam having a wavelength component corresponding to the photoconductive sensitivity of the recording layer is used to irradiate the recording layer with a high intensity. As a result, new carriers are generated to remove the recorded carrier distribution in the recording layer. It is also suitable to apply an electric field across the recording layer along with applying irradiation with the erasing beam. Further, for uniformly erasing the recording layer, the hologram recording device is suitably irradiated with a uniform intensity. The erasing beam need not be a coherent beam.

As has been described in detail in the foregoing, the hologram recording material according to the invention is of a polymer composition including a photoconductive component a second-order super-polarization component and an electron or hole capturing component, the polymer composition being of a non-centro symmetric structure. The hologram recording device according to the invention comprises a recording layer of a polymer composition including a photoconductive component and a second-order super-polarization component, the polymer composition having a non-centro symmetric structure. Transparent electrodes provided on each side of the recording layer. Thus, hologram recording, reconstruction and erasing can be carried out a desired number of times. It is thus possible to provide a hologram recording element, which is suitable for space light modulation and real time hologram recording and also as a phase conjugate device.

Particularly, the hologram recording material and the recording layer of the recording device comprising a polymer composition including a photoconductive component a second-order super-polarization component and an electron or hole capturing component and having a non-centro symmetric structure. More carriers generated by beam irradiation can remain, thus providing for a greater Pockels effect. Thus, it is possible to improve the hologram recording sensitivity or diffraction efficiency.

Further, since the recording layer is made of a polymer composition or like organic material, it is possible to increase the area of the hologram recording device.

Further, the method of manufacturing a hologram recording device according to the invention permits the hologram recording device to be readily obtained, thus permitting price reduction. In addition, it is readily possible to increase the area of the recording device.

Further, since in the method of hologram recording according to the invention an electric field is applied across the recording layer simultaneously with the beam irradiation, carrier generation is promoted. Further, the space charge distribution that is formed can be effectively coupled to a charge in refractive index for further improvement of the sensitivity of hologram recording.

Specific examples will now be given in connection with the hologram recording material, hologram recording device, method of producing the same and method of hologram recording according to the invention.

EXAMPLE 1

1.1. Preparation of raw material for hologram recording material 10 parts by weight of 2-(N-carbazolyl)ethyl acrylate, 10 parts by weight of 2-[4-($\beta,\beta$-dicyanovinyl)phenoxy]ethyl methacrylate and 0.2 part by weight of azobisisobutyronitrile were dissolved in 80 parts by weight of tetrahydrofuran contained in a three-neck flask provided with a nitrogen supply tube, a reflux condenser and a stirrer, and the solution was polymerized by stirring it at 80° C. while introducing nitrogen for 5 hours.

The resultant system was then charged into 1000 parts of methanol for re-precipitation. The system was then filtered by suction filtration. The filtrate was then dried in a vacuum, thus obtaining a polymer.

1.2. Manufacture of hologram recording device

To 100 parts by weight of this polymer were added 10 parts by weight of dibutyl phthalate and 1 part by weight of trinitrofluorenone. The mixture was then kneaded twice and extruded using a rectangular nozzle extruder, thus obtaining a plate-like sample having a width of 4 cm and a thickness of 5 mm. The sample was then processed to a shape of 3 cm by 3 cm. Then, the processed sample was dipped in an aqueous solution prepared by dissolving an acrylic acid resin, followed by drying to obtain an insulating layer. Thereafter, using a mask of 2.5 cm by 2.5 cm an ITO film was formed by spattering on each side, thus forming a transparent electrode layer on each side.

Subsequently, poling was carried out.

More specifically, the sample was heated to 120° C. in a electricoven in a dark room, and then a voltage of 10 kV was applied between opposite electrodes. After 10 minutes, the heater was turned off, and the sample was cooled in the presence of the applied electric field. After 3 hours, the temperature was reduced to room temperature. Then, the applied electric field was removed, and the sample was taken out. Thus, a hologram recording device according to the invention could be obtained.

1.3. Method of hologram recording, reconstruction and erasing

An interferometer using an argon laser as a light source was assembled in a dark room, and it was disposed such that the light beam was incident to one surface of the hologram recording device noted above at an incidence angle of 30 degrees and incident to the other surface at an incident angle of 5 degrees.

Then, irradiation was started with an intensity of about 500 $\mu$W/cm$^2$ on each side while applying a voltage of 1 kV between opposite transparent electrodes. After 10 seconds, the applied electric field was removed, and the irradiation was stopped.

Then, one surface was irradiated with the reference beam at an incidence angle of 30 degrees. As a result, a reflected diffraction beam having an emission angle of about −5 degrees was observed. Thus, hologram reconstruction was obtained.

Then, for hologram erasing, irradiation with an erasing beam from a xenon lamp was carried out for 30 seconds. Hologram reconstruction was tried using the above reconstruction optical system, but no reflected diffraction beam could be observed.

EXAMPLE 2

2.1. Preparation of raw material for hologram recording material 10 parts by weight of 3-(N-ethylcarbazolylmethyl) acrylate, 10 parts by weight of 2-{N-[4-($\beta$-cyano-$\beta$-ethoxycarbonylvinyl)]-N-methyl anilino}ethyl methacrylate and 0.2 part by weight of azobisisobutyronitrile were dissolved in 80 parts by weight of tetrahydrofuran contained in a three-neck flask provided with a nitrogen supply tube, a reflux condenser and a stirrer, and the solution was polymerized by stirring it at 80° C. while introducing nitrogen for 5 hours.

The resultant system was then cooled down and then charged into 1,000 parts of methanol for re-precipitation. The system was then filtered by suction filtration. The filtrate was then dried in a vacuum, thus obtaining a polymer.

2.2. Manufacture of hologram recording device 100 parts by weight of this polymer were dissolved along with 15 parts by weight of dibutyl phthalate and 10 parts by weight of trinitrofluorenone in 200 parts by weight of tetrahydrofuran.

Meanwhile, a slide glass with an ITO layer was prepared, and a poly(vinylalcohol) solution was spin coated on the ITO layer side, followed by drying to obtain an insulating layer. Then, the polymer solution noted above was coated on the insulating layer using a doctor knife, followed by drying to obtain a polymer composition thin film about 100 microns thick. Further, the polyvinyl alcohol solution was spin coated to form another insulating layer.

Thereafter, using a mask of 2.5 cm by 2.5 cm an ITO layer as a transparent electrode layer was formed by spattering.

Subsequently, poling was carried out.

More specifically, the sample was heated to 130° C. on a heating plate in a dark room, and then a voltage of 500 V was applied between the opposite electrodes. After 30 minutes, the heating plate was de-energized, and the sample was cooled down in the presence of an applied electric field. After 2 hours, the temperature was reduced to room temperature. Then, the applied electric field was removed, and the sample was taken out. Thus, a hologram recording device according to the invention was obtained.

2.3. Method of hologram recording, reconstruction and erasing

An interferometer using a helium neon laser as a light source was assembled in a dark room, and it was disposed such that the light beam was incident to one surface of the hologram recording device noted above at an incidence angle of 30 degrees and incident to the other surface at an incidence angle of 5 degrees.

Then, irradiation was started at an intensity of about 300 $\mu W/cm^2$ on each side while applying a voltage of 200 V between the opposite transparent electrode layers. After 40 seconds, the applied electric field was removed, and the irradiation was stopped.

Then, one surface was irradiated with the reference beam at an incidence angle of 30 degrees. As a result, a reflected diffraction beam having an emission angle of about −5 degrees was observed. Thus, hologram reconstruction was obtained.

Then, for hologram erasing, irradiation with an erasing beam from a xenon lamp was carried out for 30 seconds. Hologram reconstruction was tried using the reconstruction optical system noted above, but no reflected diffraction beam could be observed.

EXAMPLE 3

3.1. Preparation of raw material for hologram recording material 10 parts by weight of 2-(N-carbazolyl)ethyl acrylate, 5 parts by weight of methyl acrylate, 10 parts by weight of 2-{N-[4-(β-cyano-β-ethoxycarbonylvinyl-N-methyl anilino}ethyl methacrylate and 0.2 part by weight of azobisisobutyronitrile were dissolved in 80 parts by weight of tetrahydrofuran contained in a three-neck flask provided with a nitrogen supply tube, a reflux condenser and a stirrer, and the solution was polymerized by stirring it at 80° C. while introducing nitrogen for 5 hours.

The resultant system was then cooled down and then charged into 1,000 parts of methanol for re-precipitation. The system was then filtered by suction filtering. The filtrate was then dried in a vacuum, thus obtaining a polymer.

3.2. Manufacture of Hologram recording device

To 100 parts by weight of this polymer was added 5 parts by weight of tetranitrofluorenone. The mixture was kneaded in the manner as in Example 1. Thus, a hologram recording device according to the invention could be obtained.

Further, it was possible to obtain hologram recording, reconstruction and erasing in the manner as in Example 2.

EXAMPLE 4

4.1. Preparation of hologram recording material and manufacture of hologram recording device 20 parts by weight of 2-[4-(β,β-dicyanovinyl)phenoxy] ethyl methacrylate, 10 parts by weight of methyl methacrylate and 0.2 part by weight of azobisisobutyronitrile were dissolved in 70 parts by weight of tetrahydrofuran contained in a three-neck flask provided with a nitrogen supply tube, a reflux condenser and a stirrer, and the solution was polymerized by stirring it at 80° C. while introducing nitrogen for 5 hours.

The resultant system was then cooled down and then charged into 1,000 parts of methanol for re-precipitation. The system was then filtered by suction filtration. The filtrate was then dried in a vacuum, thus obtaining white polymer powder.

Further, 20 parts by weight of vinyl carbazole, 5 parts by weight of azobisisobutyronitrile and 15 parts by weight of carbon tetrachloride as a chain transfare agent were dissolved in 60 parts by weight of tetrahydrofuran contained in a three-neck flask provided with a nitrogen supply tube, a reflux condenser and a stirrer, and the solution was polymerized by stirring it at 80° C. while introducing nitrogen for 3 hours. The resultant system was then cooled down and then charged into 1,000 parts of methanol for re-precipitation. The system was then filtered by suction filtration. The filtrate was then dried, thus obtaining a white vinylcarbazole oligomer.

Then, 60 parts by weight of the polymer noted above, 10 parts by weight of polycarbonate, 10 parts of vinylcarbazole oligomer and 20 parts by weight of TPD were dissolved in 160 parts by weight of tetrahydrofuran. A slide glass with ITO provided on one side was set with the surface with ITO up, and the solution noted above was coated on the surface using a doctor blade, followed by drying to obtain a thin film of hologram recording material having a thickness of about 100 μm. In this way, two slide glass samples were prepared, each with a laminated hologram recording material film and an ITO film. These slide glass samples were then sufficiently thermally dried in a vacuum and then bonded together using a heating press by overlapping them with the hologram recording material films thereof opposing each other. A 200 μm polyimide film was sandwiched as a spacer between the samples lest the recording layer should be thin.

The resultant sample was heated to 85° C. on a hot plate in a dark room, and a voltage of 10 kV was applied between the two electrodes. After 10 minutes, the hot plate was turned off, and the sample was cooled down in the presence of the applied electric field. After one hour, the sample temperature was reduced to room temperature. Then, the applied electric field was removed, and the sample was taken out. The sample thus obtained was used as a hologram recording device.

4.2. Hologram recording, reconstruction and erasing

An interferometer using a helium cadmium laser as a light source was assembled in a dark room, and it was disposed such that the light beam was incident on one surface of the hologram recording device noted above at an incidence angle of 30 degrees and incident on the other surface at an incidence angle of 5 degrees.

Then, irradiation was started at an intensity of about 300 µW/cm$^2$ on each side while applying a voltage of 2 kV between opposite transparent electrodes. After 40 seconds, the applied electric field was removed, and irradiation was stopped.

Then, irradiation with the beam at an incidence angle of 30 degrees was carried out, and a reflected diffraction beam having an emission angle of about −5 was observed.

Further, irradiation was carried out using a xenon lamp for 30 seconds, and reconstruction was tried in a similar matter. However, no diffraction beam could be observed.

EXAMPLE 5

5.1. Preparation of hologram recording material and manufacture of hologram recording device 5 parts by weight of poly(vinylcarbazole), 1.2 parts by weight of N,N-diethyl-4-nitroaniline, 0.07 part by weight of tetranitrofluorenone and 0.65 part by weight of dibutyl phthalate were dissolved in 20 parts by weight of tetrahydrofuran. On a glass plate, with the surface thereof made hydrophobic with a dichloromethane solution of chlorotrimethylsilane, the solution noted above was coated using a doctor blade, followed by drying to obtain a thin film having a thickness of about 50 µm. This thin film was cut to a size of 2 cm by 2 cm. Seven such cut pieces were stacked and bonded together using a heating press by sandwiching the stack together with a 300 µm poly(ethylene naphthalate) spacer between two slide glass pieces each with one surface provided with an ITO film.

The sample thus obtained was heated to 75° C. on a hot plate in a dark room, and a voltage of 15 kV was applied between the two electrode. After 10 minutes, the hot plate was turned off, and the sample was cooled down in the presence of the applied electric field. After one hour, the sample temperature was reduced to room temperature. Then, the applied electric field was removed, and the sample was taken out. The resultant sample was used as a hologram recording device.

5.2. Hologram recording, reconstruction and erasing

An interferometer using a 632.8 nm helium neon laser as a light source was assembled in a dark room, and it was disposed such that beam was incident to one surface of the hologram recording device noted above at an incidence angle of 30 degrees and incident to the other surface at an incidence angle of 5 degrees.

Then, irradiation was started at an intensity of 500 µW/cm$^2$ on each side while applying a voltage of 15 kV. After 20 seconds, the applied electric field was removed, and irradiation was stopped.

Then, irradiation with the beam at an incidence angle of 30 degrees was carried out, and a reflected diffration beam having an emission angle of −5 degrees could be observed.

Further, irradiation using a xenon lamp was carried out while applying a voltage of 15 kV between the electrodes for 30 seconds, but no diffraction beam could be observed.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A hologram recording material comprising at least one polymer composition having a non-centro symmetric structure and including a photoconductive component, a second-order super-polarization component and a hole capturing component, wherein said polymeric composition is:

(I) a copolymer of 2-(N-carbazolyl) ethyl acrylate and 2-(4-(β, β-dicyanovinyl) phenoxy) ethyl methacrylate, dibutyl phthalate, and trinitrofluroenone;

(II) a copolymer of 3-(N-ethylcarbazolylmethyl) acrylate and 2-{N-(4-(β-cyano-β-ethoxycarbonylvinyl))-N-methyl anilino} ethyl methacrylate, dibutyl phthalate, and trinitrofluorenone;

(III) a copolymer of 2-(N-carbazolyl) ethyl acrylate and 2-{N-(4-(β-cyano-β-ethoxycarbonylvinyl))-N-methyl anilino} ethyl methacrylate, and trinitrofluorenone; or (IV) a copolymer of 2-(4-(β, β-dicyanovinyl) phenoxy) ethyl methacrylate and methyl methacrylate, polycarbonate, a vinylcarbazole oligomer, and N, N'-diphenyl-N'N'-bis (3-toluoyl)- 4,4'-diaminobiphenyl.

2. A hologram recording device comprising (i) a recording layer comprising a hologram recording material according to claim 1; and (ii) transparent electrode layers provided on each side of said recording layer.

3. A method of manufacturing a hologram recording device comprising at least the steps of:

(1) preparing a solution containing at least one polymer composition having a photoconductive component in the solid state, a second-order super-polarization component and an electron or hole capturing component;

(2) forming a plurality of films of said polymer composition by successively coating said solution of said polymer composition and then drying said coating;

(3) fusing together said plurality of films formed in step (2) by sandwiching said plurality of films as a stack between two transparent substrates each with a transparent electrode layer formed on one side such that said transparent electrode layer is in contact with said film stack using a heating press, and (4) heating said fused recording layer to a temperature of about or above the glass transition temperature of said polymer composition while applying an electric field between said transparent electrode layers, and subsequently cooling down the heated recording layer, wherein said polymer composition is:

(I) a copolymer of 2-(N-carbazolyl) ethyl acrylate and 2-(4-(β,β-dicyanovinyl) phenoxy) ethyl methacrylate, dibutyl phthalate, and trinitrofluroenone;

(II) a copolymer of 3-(N-ethylcarbazolylmethyl) acrylate and 2-{N-(4-(β-cyano-β-ethoxycarbonylvinyl))-N-methyl anilino} ethyl methacrylate, dibutyl phthalate, and trinitrofluorenone;

(III) a copolymer of 2-(N-carbazolyl) ethyl acrylate and 2-{N-(4-(β-cyano-β-ethoxycarbonylvinyl))-N-methyl anilino}ethyl methacrylate, and trinitrofluorenone; or (IV) a copolymer of 2-(4-(β,β-dicyanovinyl) phenoxy) ethyl methacrylate and methyl methacrylate, polycarbonate, a vinylcarbazole oligomer, and N, N'-diphenyl-N'N'-bis (3-toluoyl)- 4,4'-diaminobiphenyl.

4. A method of hologram recording comprising (i) irradiating a coherent beam at each side of a recording layer comprising at least one polymer composition, said polymer composition having a non-centro symmetric structure and having a photoconductive component and a second-order super-polarization component, and (ii) applying a DC voltage during said coherent beam irradiation between transparent electrode layers provided on each side of said recording layer, wherein said polymer composition is:

(I) a copolymer of 2-(N-carbazolyl) ethyl acrylate and 2-(4-(β,β-dicyanovinyl) phenoxy) ethyl methacrylate, dibutyl phthalate, and trinitrofluroenone;

(II) a copolymer of 3-(N-ethylcarbazolylmethyl) acrylate and 2-{N-(4-(β-cyano-β-ethoxycarbonylvinyl))-N-methyl anilino} ethyl methacrylate, dibutyl phthalate, and trinitrofluorenone;

(III) a copolymer of 2-(N-carbazolyl) ethyl acrylate and 2-{N-(4-(β-cyano-β-ethoxycarbonylvinyl))-N-methyl anilino} ethyl methacrylate, and trinitrofluorenone; or (IV) a copolymer of 2-(4-(β,β-dicyanovinyl) phenoxy) ethyl methacrylate and methyl methacrylate, polycarbonate, a vinylcarbazole oligomer, and N, N'-diphenyl-N'N'-bis (3-toluoyl)- 4,4'-diaminobiphenyl.

* * * * *